US007119669B2

(12) United States Patent
Lundsgaard et al.

(10) Patent No.: US 7,119,669 B2
(45) Date of Patent: Oct. 10, 2006

(54) METHOD AND APPARATUS FOR DETECTING VEHICULAR COLLISIONS

(75) Inventors: Soren K. Lundsgaard, Inverness, IL (US); Nick J. Grivas, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 133 days.

(21) Appl. No.: 10/738,734

(22) Filed: Dec. 16, 2003

(65) Prior Publication Data

US 2005/0128062 A1 Jun. 16, 2005

(51) Int. Cl.
*B60Q 1/00* (2006.01)

(52) U.S. Cl. .................. 340/436; 340/425.5; 340/467; 340/539.18; 340/903; 455/404.1; 455/567

(58) Field of Classification Search ................ 340/933, 340/435, 436, 539.18, 425.5, 903, 467; 701/45, 701/30, 29; 455/404.1, 567, 569.1, 557, 455/575.1
See application file for complete search history.

(56) References Cited

U.S. PATENT DOCUMENTS 5,969,598 A 10/1999 Kimura
6,266,617 B1 7/2001 Evans
6,340,928 B1 * 1/2002 McCurdy .................... 340/436
6,459,988 B1 10/2002 Fan et al.
6,690,302 B1 * 2/2004 Inomata ...................... 340/989
6,792,295 B1 * 9/2004 Hanevich et al. ........ 455/569.1
6,812,832 B1 * 11/2004 Lobaza et al. .............. 340/436
6,851,504 B1 * 2/2005 Campbell et al. ........... 180/271

* cited by examiner

*Primary Examiner*—Davetta W. Goins
(74) *Attorney, Agent, or Firm*—Phillip H. Burrus, IV; Brian M. Mancini; Terri S. Hughes

(57) ABSTRACT

A portable electronic device, like a cellular telephone is capable of detecting collisions between vehicles and notifying the proper authorities. The device includes a microprocessor and memory, in addition to an accelerometer and global positioning systems receiver. The memory includes at least one filter for screening out false positives, which are false collision detections. In one embodiment, the device determines its velocity. It then checks to see if its velocity falls within a range associated with moving vehicles. If so, the device monitors the accelerometer. When acceleration values in excess of a predetermined threshold are detected, the device pauses and again checks its velocity. If the velocity has fallen from the range associated with moving vehicles to a range associated with a vehicle that has sustained a collision, the device notifies emergency personnel that a collision has occurred. Another filter includes an operability check of the keypad, coupled with a notification message that the authorities will be called if the keypad has not been actuated within a predetermined time. Another embodiment includes a detector capable of detecting a vehicular cradle, such that the notification only occurs when high acceleration values are detected in a vehicle.

18 Claims, 6 Drawing Sheets

METHOD AND APPARATUS FOR DETECTING VEHICULAR COLLISIONS

BACKGROUND

1. Technical Field

This invention relates generally to a method and apparatus for detecting collisions between vehicles, and more specifically to a method and apparatus for using a portable electronic device, like a cellular telephone, to detect collisions using acceleration data, and to notify a third party when such collisions occur.

2. Background Art

Collisions between vehicles are bad experiences for everyone involved. Not only are they costly and time consuming, but serious collisions may even cause life-threatening injuries as well. The amount of time that lapses between impact and notification of authorities to the arrival of emergency personnel can mean the difference between life and death. Immediate notification of the accident is imperative in reducing the overall response time of emergency services.

For minor "fenderbenders", immediate response time is generally not a problem. To begin, such minor accidents generally do not involve life-threatening injuries. Additionally, as most people carry cellular telephones when they travel, a person involved in a minor accident may simply call "911" after the collision.

For serious accidents, however, simply calling the authorities may not be possible. Seriously injured travelers often lose either consciousness or the ability to operate a phone in such accidents. Consequently, an unconscious or seriously injured driver or passenger risks sustaining permanent injuries or even death by not being able to use a phone.

One prior art solution to this "automatic notification" problem is to couple a telematic device to a vehicle's safety systems. For example, cars equipped with the OnStar™ system have alert systems that are tied to the deployment of airbags. The OnStar™ system further included an embedded cellular phone. When a person is involved in an accident, and the airbags deploy, the OnStar™ system places a cellular call and notifies an operator of the deployment. If the car is equipped with a global positioning system (GPS) device, the OnStar™ system will notify the operator of the vehicle's location as well.

The problem with this prior art solution is that many cars are sold without OnStar™. Such systems are not standard equipment, and are generally sold as an option for an additional fee. Additionally, older cars, built before OnStar™, do not include this equipment (and may not even include airbags). Further, passenger transportation, like busses and trains, generally do not include such notification equipment.

There is thus a need for an improved collision notification system that is portable and that works independently, without the need of embedded vehicular subsystems.

DETAILED DESCRIPTION OF THE INVENTION

Figure 1:
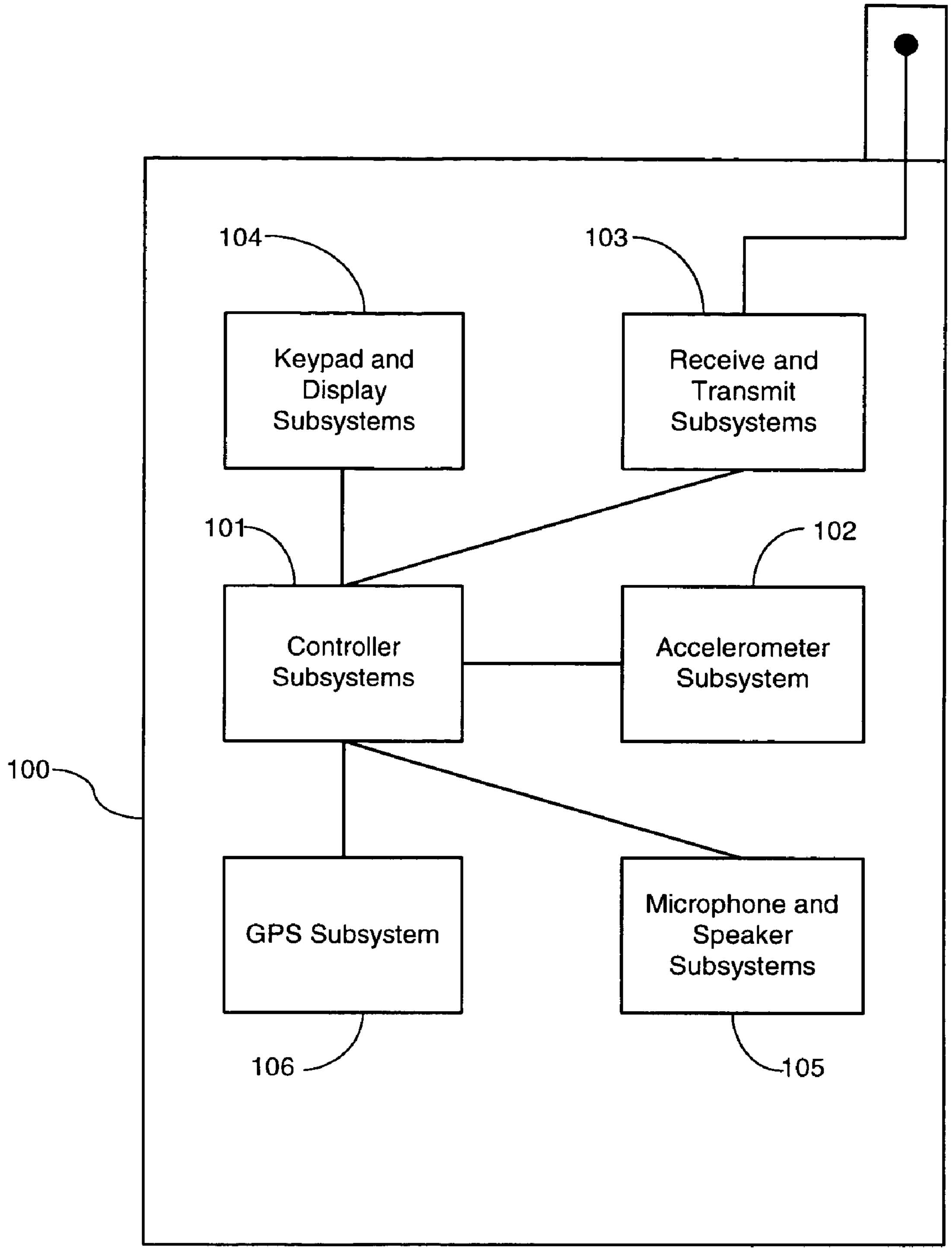
FIG. 1 illustrates one preferred embodiment of a portable electronic device in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides a portable electronic device, like a cellular telephone for example, that is capable of detecting collisions by sensing the acceleration of the portable device. The device includes one or more of a plurality of filters that prevent false collision detections. For example, if the portable device were dropped by a user, the device would sense a dramatic acceleration upon impact with the ground. Filters are provided to prevent this dropped situation from summoning the authorities, while allowing the device to call the authorities when an actual collision occurs. Additionally, the invention optionally includes a sensing means that allows the portable device to tell whether it is present in a vehicle.

As stated in the preceding paragraph, one aspect of the invention operates by sensing the acceleration, in three dimensions, of the portable device. U.S. Pat. No. 6,459,988 (B1) teaches a mobile device for signaling a collision based upon changes in acceleration. To calculate acceleration, the '988 patent employs the Global Positioning System (GPS). The mobile device of the '988 patent receives a constant stream of positional coordinates from the GPS, and then calculates acceleration based upon these geographic coordinates and an internal clock. When acceleration changes dramatically, the mobile device notifies the authorities that a collision has occurred.

The calculation-based system of the '988 patent presents three problems: First, the processing power to calculate acceleration from a series of position coordinates is quite large. Calculating a derivative of velocity is bandwith-intensive. Consequently, one must have a dedicated device, with an expensive microprocessor, to perform these extensive calculations. For this reason, the system of the '988 patent is not suited to small, multitasking devices like cellular phones.

Second, the system of the '988 patent relies on a stream of geographic coordinates from the satellite-based GPS system. The accuracy of these coordinates, as seen by civilian electronics, is limited. Further, small changes in position are not easily detected. Consequently, it is often quite difficult to determine whether an applied acceleration was due to a sudden stop (for example at a light that suddenly turns red), or was due to an actual collision.

Third, GPS-based solutions only work when the antenna of the GPS device has a direct line of sight to the satellite. If the antenna of the device happens to be, for example, in a tunnel in an urban area, the satellite signal will be lost.

The present invention solves both of these problems by providing a simple, accurate acceleration-based collision detection system that may be implemented on processors like those found in cellular telephones. The invention provides a portable device equipped with a three-dimensional accelerometer. When sudden changes in velocity occur (i.e., acceleration), a microprocessor in the portable device indicates that a collision-like event has occurred. The invention includes several filters that prevent false alarms, like sudden, deliberate, braking stops for example. When a collision event occurs, and the event is not annulled by a filter, the portable electronic device calls authorities and reports that a collision has occurred.

Upon notifying the authorities, the device transmits information about the collision. For example, the portable device transmits collision location by way of a GPS sensor. The portable device may also include a prerecorded message that relays information about the device's owner, including medical information, to the proper authorities and emergency response team.

Referring now to FIG. 1, illustrated therein is one preferred embodiment of a portable electronic device in accordance with the invention. For discussion purposes, the electronic device 100 will be described as a cellular telephone, although it will be clear to those of ordinary skill in the art having the benefit of this disclosure that the invention is not so limited. It could also be implemented in pagers, two way radios, personal data assistants (PDAs), and the like.

The phone 100 includes traditional cellular phone components, including interface systems represented here by a keypad and display 104, RF transmitter/receiver subsystems 103 and microphone/speaker subsystems 105. The controller subsystem 101 comprises a microprocessor and associated memory. The memory components may include both volatile and non-volatile memory. The memory may be integrated into the microprocessor, or may be a chipset that is discrete from the microprocessor. The non-volatile memory component includes the firmware that not only serves as the operating system for the phone 100, but also includes the filters, as recited below, that prevent false collisions from being detected.

Two central components of this preferred embodiment of the phone are the accelerometer subsystem 102 and the GPS subsystem 106. The accelerometer subsystem 102 includes a small, lightweight accelerometer, as well as the accompanying signal conditioning and amplification circuitry. Any number of accelerometers may be used with the present invention. One example of such an accelerometer is the EGA series of miniature accelerometers manufactured by the Entran Corporation. Another is the SMOS7LV accelerometer ASIC manufactured by Motorola. These small, lightweight accelerometers are well suited to small portable electronic devices, and measure steady state, as well as dynamic, acceleration. The acceleration measurement is made by computing the square root of sum of the squares of the accelerations in the X, Y and Z directions.

The GPS subsystem 106 includes a small GPS receiver for downloading geographical coordinates from the GPS system. Any of a number of GPS receivers may be used in accordance with the invention. One such GPS receiver is the UV-40 16-channel miniature GPS receiver manufactured by the Laipac Technology Corporation. The microprocessor in the controller subsystem 101 continually reads data from the GPS receiver in the GPS subsystem 106 to determine where the phone 100 is geographically. Additionally, the microprocessor may compute the velocity of the phone 100 by dividing changes in position by elapsed time. Note also that many modern GPS systems deliver not only positional information, but velocity information as well. If such a GPS receiver is used, i.e. one that delivers position and velocity, the need for calculating velocity with the microprocessor is eliminated.

The microprocessor reads acceleration directly from the accelerometer in the accelerometer subsystem 102. The direct reading of acceleration eliminates the step of having to calculate the derivative of velocity to acquire acceleration values. Calculating such rates of change requires a robust processor, which is often not available in small, portable devices like phones. By employing a miniature accelerometer, the microprocessor may simply read the acceleration values directly from the accelerometer and store them in the memory in the controller subsystem 101.

In the simplest form, the phone 100 operates as follows: When a sudden rapid motion, is detected by the accelerometer, thereby causing a spike in acceleration, the microprocessor of the controller subsystem notes that a collision type event has occurred. Stored in the memory of the controller subsystem 101 is emergency information, for example the phone number "911", as well as electronic data and/or recorded messages that may be transmitted to the authorities in the event of a collision. These messages may include information like personal and medical information about the owner of the phone 100. In addition, the microprocessor of the controller subsystem 101 stores the magnitude, time and location of the collision (via the GPS subsystem 106).

When the controller subsystem 101 detects a collision event, it causes the transmit/receive subsystem 103 to dial the emergency number stored in the memory of the controller subsystem 101. The controller subsystem 101 then transmits the textual or recorded messages in the appropriate sequence to notify the emergency personnel of the details of the collision and the party involved. This notification allows the emergency personnel to respond appropriately.

Figure 2:
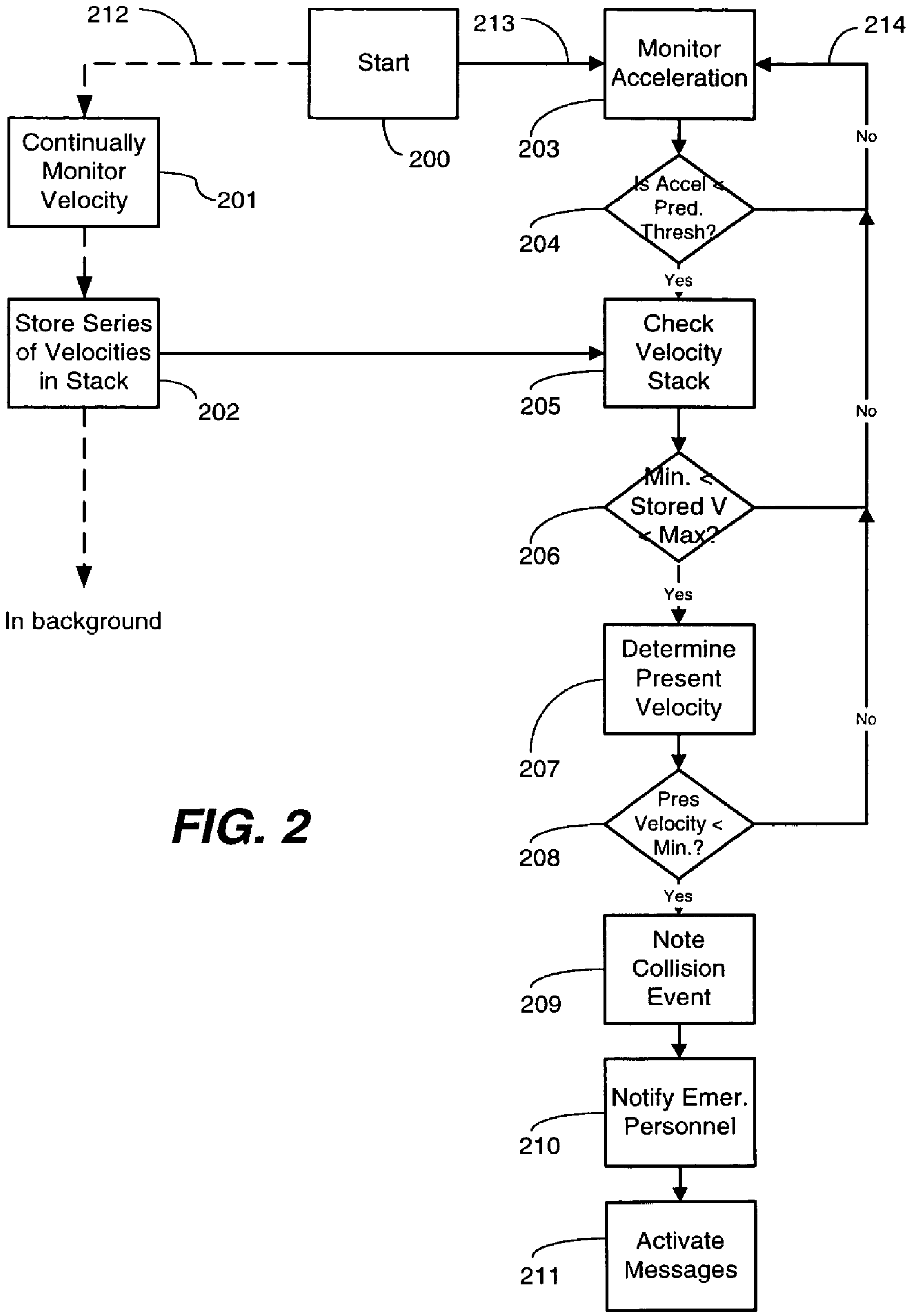
FIG. 2 illustrates one of a plurality of false-positive filters that may be implemented in firmware in accordance with the invention.

An immediate concern that comes to mind is the following: What if I drop my phone? That causes a spike in the acceleration—will the device call the authorities every time I drop my phone? Referring now to FIG. 2, illustrated therein is one of a plurality of false-positive filters that may be implemented in firmware stored in the memory of the controller subsystem 101. The firmware provides a plurality of actions that are to be executed by the microprocessor. The microprocessor of the controller subsystem 101, by executing the actions of these filters, eliminates the false positives of emergency notification in the presence of false-collision events.

In FIG. 2, illustrated therein is one filter in accordance with the invention, with starting point 200. Branch 212 represents a continual process operating in the background. In this process, the microprocessor continually keeps a recent record of velocity values. At step 201, the microprocessor simply divides the distance between successive GPS coordinates by the time that has elapsed between the receptions of the coordinates, or reads the velocity from the GPS receiver directly. At step 202, the microprocessor adds the most recently calculated velocity to a stack of recently calculated values. The microprocessor may also keep a running average of these velocities as well.

At step 203, the microprocessor continually monitors the output of the accelerometer, thereby monitoring the acceleration of the phone 100. At step 204, the microprocessor compares the output of the accelerometer with a predetermined threshold, which may be 5*9.8 m/s$^2$, or 5 "Gs", for example. So long as the acceleration remains below this predetermined threshold, the filter returns to step 203 via path 214. Note that a preferred range of "G" values for which the accelerometer should be able of detecting with the present invention is 25 to 400. The accelerometer is preferably capable of withstanding at least 3000 G without failure, to ensure that the accelerometer survives the automobile accident.

Once the acceleration exceeds this predetermined threshold, however, the filter proceeds to step 205. At step 205, the microprocessor reads recent velocity values (as stored in the stack at step 202). At step 206, the microprocessor checks to see whether these velocities correspond to velocities associated with moving vehicles. For instance, a minimum value may be 5 m.p.h., which is the minimum impact rating of bumpers on American cars. A maximum value may be 125–150 m.p.h., the maximum speed of most domestic cars. A preferred range of velocities would be between 15 m.p.h., the speed of a human running quickly, and 150 m.p.h.

When the velocity falls within this predetermined range, the filter proceeds to step 207 where the current velocity is read. During a collision, with the exceptions of hit and run incidents, the final velocity of the vehicle will be below a predetermined minimum threshold, and will probably be zero. As such, at step 208, the microprocessor checks to see if the present velocity is zero, or at least below the predetermined minimum, which will be no more than 5 m.p.h.

If all of the above are true, specifically that an acceleration value above a predetermined threshold is detected, the recent velocities are within a predetermined range, and the present velocity is below the minimum threshold, the filter proceeds to step 209, wherein the microprocessor denotes a collision has occurred. At step 210, the emergency personnel or proper authorities are notified. At step 211, the messages, including present position, information about the collision and information about the phone's owner are actuated and transmitted to the authorities.

The filter of FIG. 2 eliminates many false positives in collision detection. One such false positive occurs when a phone is dropped. A dropped phone experiences a high acceleration value when it hits the ground. When dropped, the phone initially measures a force of 0 G, as the acceleration caused by the gravitational force, which causes the phone to fall, cancels with the 1 G force being applied to phone constantly by gravity. When the phone hits the ground, however, the equal and opposite reaction of Newton's laws cause an equal and opposite force to be applied to the phone. This redirection of force causes the accelerometer to measure a very high value.

The filter eliminates this false positive in a couple of ways. A first way to eliminate this false positive is to simply set the predetermined acceleration threshold to a value greater than those values associated with dropped phones. For example, simply tossing the phone onto a car seat causes a relatively low acceleration to be measured. By setting the threshold below the values associated with such "soft drops", nuisance false positives may be eliminated.

The second way that dropped phone false positives may be eliminated is by way of the velocity profile. If a person is standing, sitting or walking and drops the phone, the recent velocities in the stack will not fall within the range corresponding to that of a moving vehicle. As such, these false positives will be screened out by way of step 206.

A second type of false positive occurs when a phone is thrown. Mischievous souls may attempt to "trick" the system by throwing their phone across the room or against a wall. However, the filter of FIG. 2 stifles such shenanigans. While the velocity just after a throw can be quite high, and well within the range associated with vehicles, the velocity just prior to the throw will be at rest. In other words, when our mischief maker is contemplating his throw, the phone will be at zero velocity in his hand. As such, when the filter checks the recent velocities in the stack at step 206, this zero velocity will not correspond to the predetermined range associated with vehicles. Thus, let the mischief maker throw at will. The filter will screen out any false positives he attempts to create.

Figure 3:
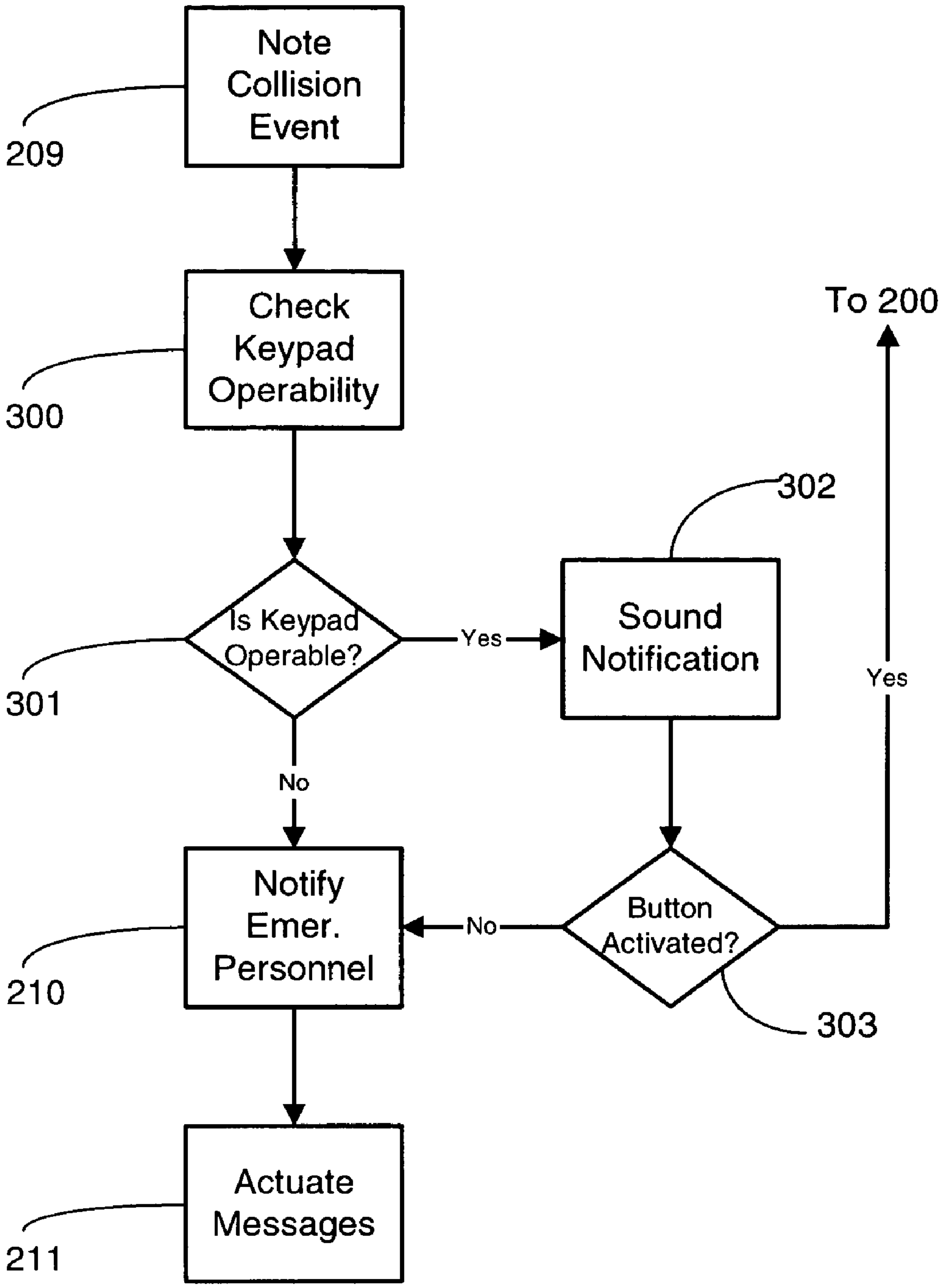
FIG. 3 illustrates one of a plurality of false-positive filters that may be implemented in firmware in accordance with the invention.

Referring now to FIG. 3, illustrated therein is a second filter which may be incorporated into the present invention. As many injury-causing collisions result in severe damage to the vehicle, there is a probability that the phone's extremities will be damaged as well. The filter of FIG. 3 checks the phone for damage prior to notifying emergency personnel. Once a collision has been noted, as recited with respect to step 209 in FIG. 2, at step 300 the microprocessor checks the phone's keypad for operability. It will be clear to those of ordinary skill in the art having the benefit of this disclosure that other phone components, including the display, microphone and speaker may be tested instead of the keyboard. At step 301, the microprocessor decides whether the keyboard is operable.

If the keyboard is operable, the microprocessor sounds a user alert at step 302. The alert may be an audible message like the following: "Warning! Warning! Collision detected . . . Authorities will be notified if a key is not pressed in the next five seconds . . . " Alternatively, a visual indicator may be actuated, for example a strobe light.

At step 303, the microprocessor senses whether a key has been pressed. If it has not, the inference to be made is that the user is unable to activate the phone and is therefore probably injured. As such, the microprocessor notifies the authorities at steps 210 and 211 as recited with FIG. 2. Note that if the keyboard is not operable, as determined in step 301, the microprocessor presumes that the phone has been damaged in the collision. In such a case, the microprocessor notifies the authorities immediately at step 210.

The filter of FIG. 3 eliminates several types of false positives. The first, as with FIG. 2, is the scenario of the dropped phone. By announcing that a collision has been detected at step 302, the phone's owner has the opportunity to deactivate the automatic notification. Second, when the phone is bumping along on the seat of the car and accidentally falls on the floor, the user will be able to deactivate the automatic notification as well.

Figure 7:
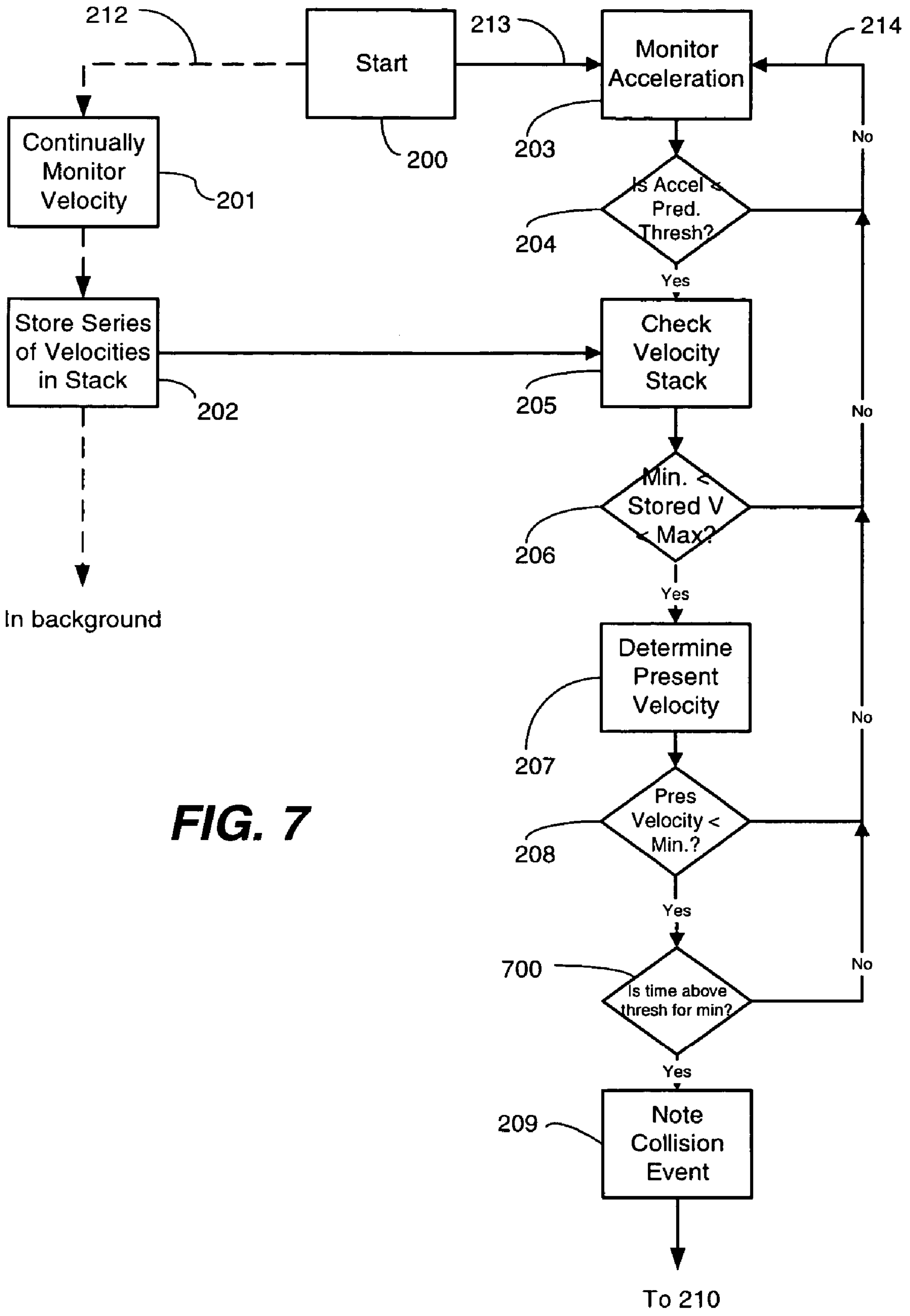
FIG. 7 illustrates one of a plurality of false-positive filters that may be implemented in firmware in accordance with the invention.

Referring now to FIG. 7, illustrated therein is a third filter. Recall from the discussion above that a dropped phone initially experiences a very low acceleration due to the fall. When the phone strikes a rigid surface, however, the phone experiences a higher acceleration that is dependent upon the surface that the phone strikes. For soft surfaces, simply setting the predetermined threshold above such forces is sufficient.

However, when the phone strikes a rigid surface like concrete or tile, the phone will experience a short, high acceleration. Very shortly after the phone experiences this high acceleration, however, the phone will come to rest.

On the other hand, when a phone is in a car that sustains an accident, large acceleration values are measured for a longer period of time. As such, step 700 checks to ensure that the acceleration value has remained above the predetermined threshold for a minimum time, for example 0.5 seconds. If so, the control unit proceeds to step 209, just as with the discussion of FIG. 2. If not, the control unit presumes that the phone has been dropped, and that no collision has occurred.

This filter is best explained by way of example. Imagine a phone that is loosely resting on the seat of an automobile. When a driver stops quickly, inertia causes the phone to slide off the seat. This sliding off the seat is analogous to a dropped phone.

Figure 5:
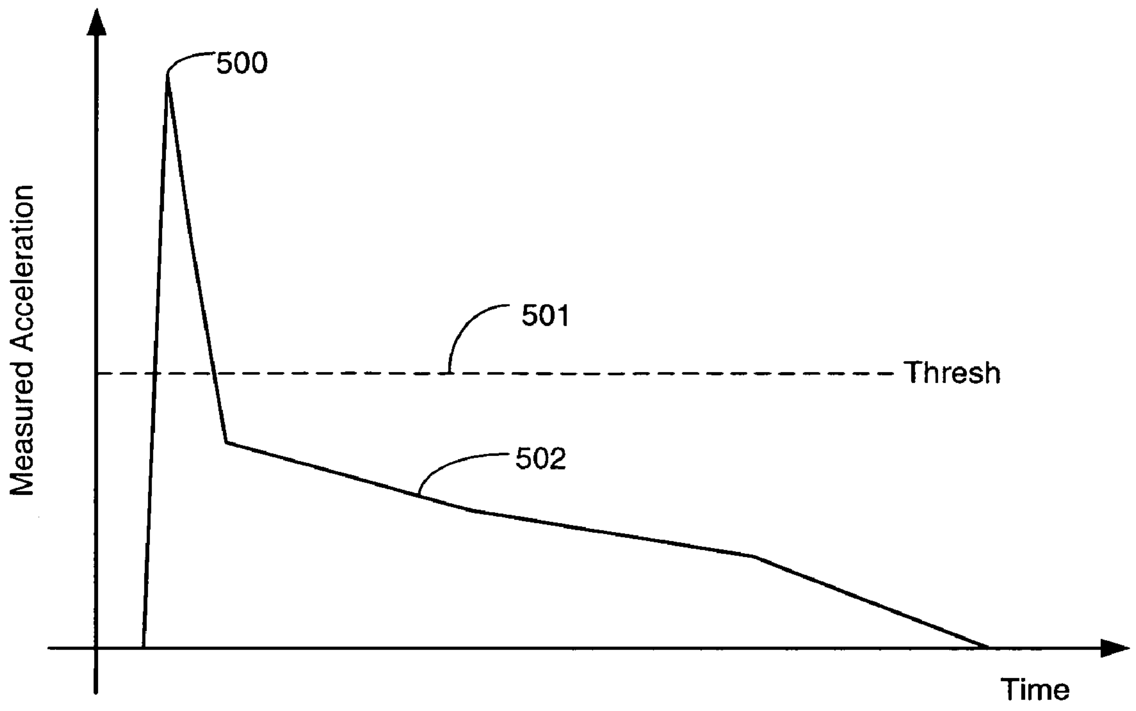
FIG. 5 illustrates an acceleration curve for a portable device in a vehicle under hard braking.

Turning briefly to FIG. 5, illustrated therein is a plot of acceleration with respect to time. When the phone slides off the seat, and hits the floorboard or firewall of the car, the phone experiences a short, high value of acceleration 500. The acceleration of the phone very quickly falls below the predetermined threshold 501, however, and then feels the acceleration of the car during its braking cycle 502, which is below the predetermined threshold 501. As the measured acceleration has not remained above the predetermined threshold 501 for a predetermined minimum time, the control unit understands that a non-collision event has occurred.

Figure 6:
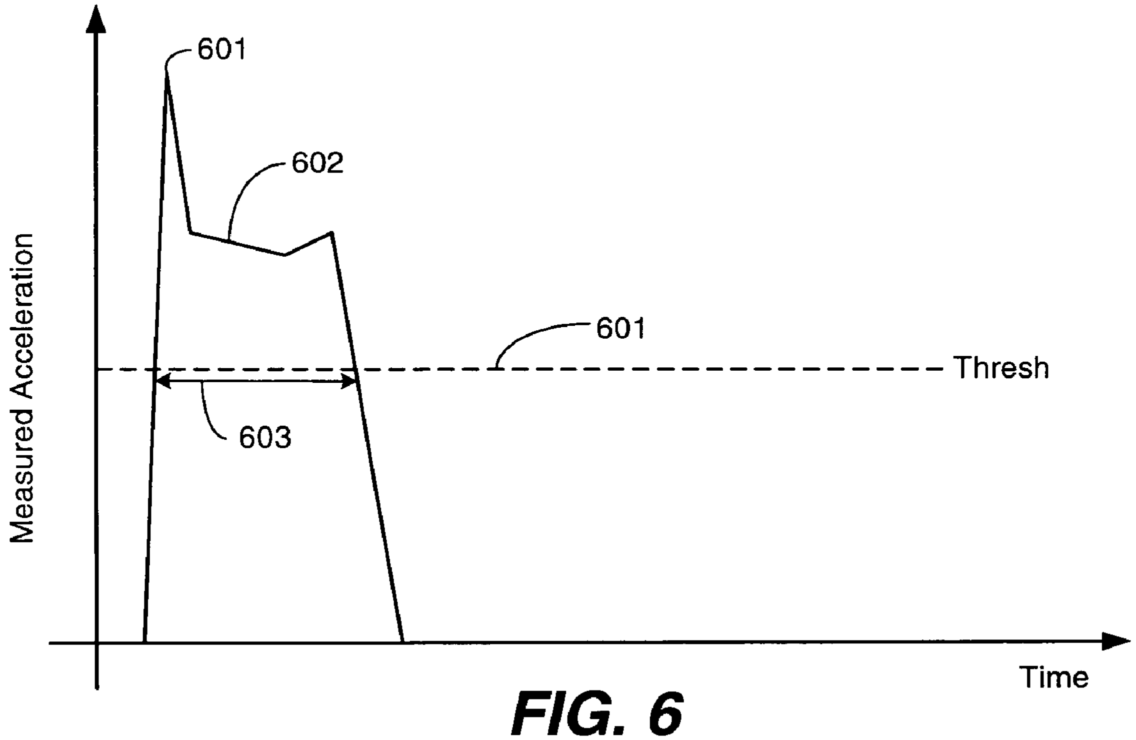
FIG. 6 illustrates an acceleration curve for a portable device in a vehicle during a collision.

Turning to FIG. 6, illustrated therein is a collision. As can be seen, when the collision begins, the phone may slide off the seat, just as in the braking scenario, at segment 600. However, rather than experiencing the acceleration caused by the car braking, the phone now experiences the violent acceleration of a vehicle in collision at segment 602. This collision-based acceleration 602 causes the measured acceleration to remain above the predetermined threshold 601 for a time 603 greater than the predetermined minimum. This causes the control unit to note a collision event at step 209 of FIG. 7.

Note that an alternate means of ensuring that the measured acceleration is commiserate with a collision and not a drop is by integrating the measured acceleration over a predetermined time. The integration would eliminate spikes based upon drops and slides off of car seats, while yielding an average value that would be large when high-energy events occur, but low when drops occur.

Figure 4:
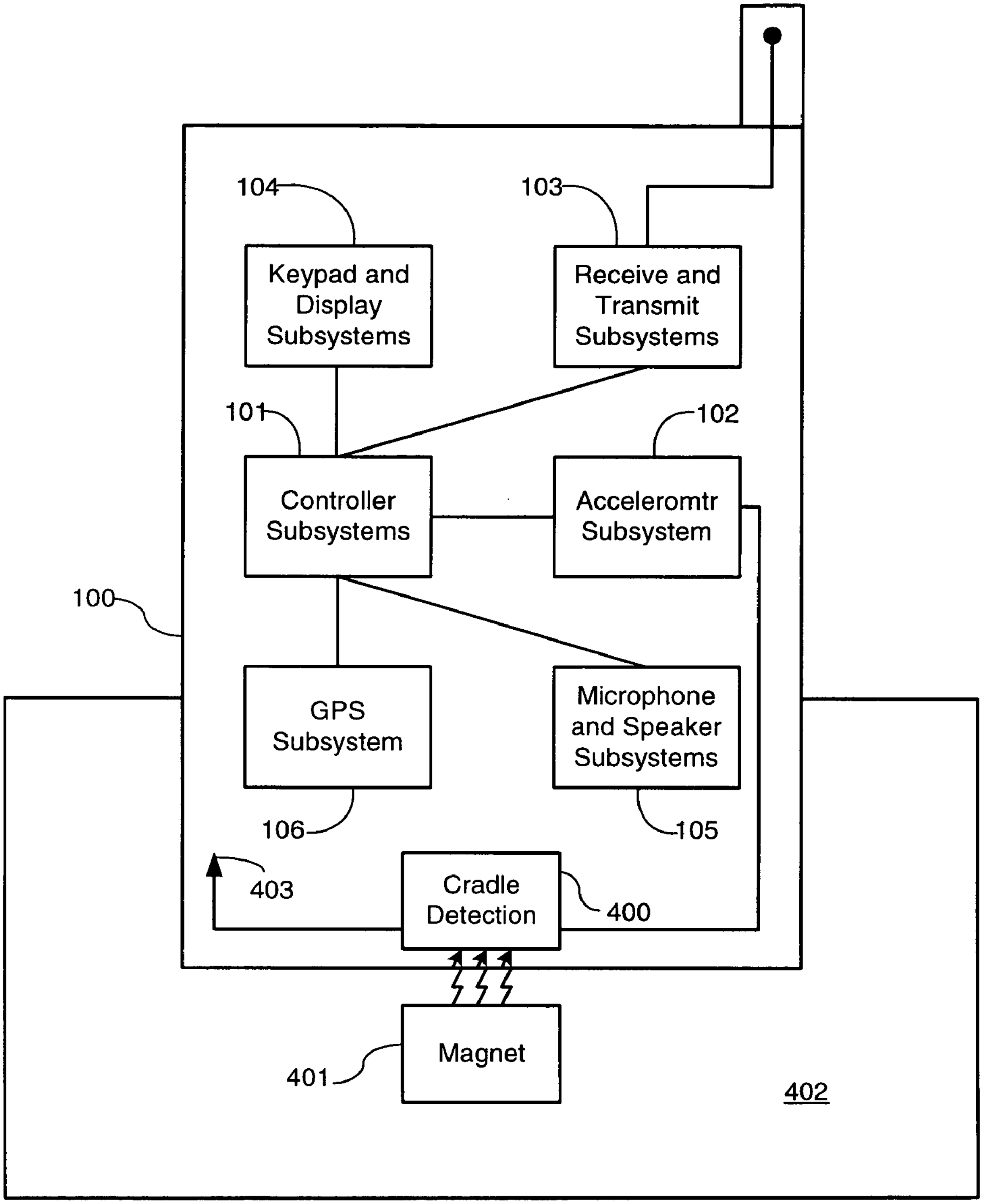
FIG. 4 illustrates one preferred embodiment of a portable electronic device in accordance with the invention, where the electronic device includes a vehicular cradle adaptor.

Referring now to FIG. 4, illustrated therein is another preferred embodiment of the invention. The phone 100 includes many of the same components as with respect to FIG. 1, including a keypad/display 104, a RF receiver/transmitter 103, a controller subsystem 101, an accelerometer subsystem 102, a GPS subsystem 106 and a microphone/speaker 105.

In addition to these components, the phone 100 of FIG. 4 also includes a means for detecting that the phone is located within a vehicle, for example in a vehicular cradle. One exemplary means for detecting a vehicle or cradle is by way of a reed switch 400. A reed switch is a magnetically actuated switch that closes in the presence of a magnetic field. As many vehicles are equipped with phone-carrying cradles, a cradle 402 is provided that is equipped with a means of actuating the means for detecting the vehicular cradle, like a magnet 401. When the phone 100 is in the cradle 402, the magnet 401 causes a magnetic field to actuate the reed switch 400, thereby coupling power 403 to the accelerometer subsystem 102.

This assembly thereby allows the accelerometer subsystem 102 to be actuated only when the phone 100 is placed in the vehicular cradle 402, thereby facilitating collision notifications only when acceleration is detected within the confines of the vehicle. Such an assembly prevents false positives caused by dropped or thrown phones.

It will be clear to those of ordinary skill in the art having the benefit of this disclosure that the embodiment of FIG. 4 is not limited to reed switches 400 and magnets 401. Other devices that are capable of actuating switches without physically touching are acceptable as well. One such option is a Hall-effect sensor in the phone 100, with a magnetic field generator in the cradle 402.

Additionally, while the reed switch 400 is shown here as coupling power 403 to the accelerometer subsystem 102, other configurations may be substituted as well. For example, the accelerometer subsystem may be powered continually, and the reed switch 400 may close to couple a logic signal to the microprocessor, thereby indicating that the phone 100 is coupled to the vehicular cradle 402. Further, rather than using a contactless switch to indicate that the phone 100 is coupled to the vehicular cradle, other techniques, including monitoring data communications with peripheral devices, monitoring charging of the battery, monitoring audio communications with vehicular car-kits and hands-free accessories, or wireless connections may be substituted.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while various filters have been described, it will be clear that these filters could be used in combination as well.

What is claimed is:

1. A portable, electronic device capable of detecting a collision, the device comprising:

a controller subsystem;

a radio-frequency transmit and receive subsystems;

a global positioning system subsystem; and an accelerometer;

wherein the controller subsystem comprises a microprocessor and a memory, the memory having firmware stored therein, and wherein the firmware comprises at least one filter for preventing false positives from being detected; and wherein the at least one filter is dependent on an output of the global positioning system subsystem and an output of the accelerometer.

2. The device of claim 1, wherein the at least one filter comprises a plurality of actions to be executed by the microprocessor, the plurality of actions comprising:

monitoring a velocity of the device;

recording a plurality of velocity values in the memory;

monitoring an acceleration of the device via the accelerometer;

determining when the velocity falls within a predetermined range;

determining when the acceleration exceeds a predetermined threshold; and actuating the transmit subsystem to notify an external source that a collision has occurred when both the velocity is within the predetermined range and the acceleration exceeds the predetermined threshold.

3. The device of claim 2, wherein the plurality of actions further comprises determining the velocity of the device after the acceleration falls below a predetermined minimum threshold.

4. The device of claim 3, wherein the actuating the transmit subsystem occurs only when:

the velocity is within the predetermined range;

the acceleration exceeds the predetermined threshold; and the velocity of the device, after the acceleration falls below the predetermined minimum threshold, falls below a second predetermined threshold.

5. The device of claim 4, wherein the actuating the transmit subsystem occurs only when the acceleration exceeds the predetermined threshold for at least a predetermined minimum time.

6. The device of claim 2, further comprising a keypad, and wherein the plurality of actions further comprises:
determining the operability of the keypad;
notifying a user that a collision has been detected; and
if the keypad is operable, notifying the user that the transmit subsystem will be actuated if a key on the keypad is not pressed.

7. A portable, electronic device capable of detecting a collision, the device comprising:
a controller subsystem;
a radio-frequency transmit and receive subsystems;
a global positioning system subsystem;
an accelerometer; and
a means for detecting a vehicular cradle,
wherein the device actuates the accelerometer to facilitate the detection of a collision only if the vehicle cradle is detected.

8. The device of claim 7, wherein the means for detecting the vehicular cradle is selected from the group consisting of reed switches, Hall effect sensors, means for monitoring data communications with peripheral devices, means for monitoring charging of the battery, and means for monitoring audio communications with vehicular car-kits and accessories.

9. The device of claim 7, wherein the controller subsystem comprises a microprocessor and a memory, the memory having firmware stored therein, wherein the firmware comprises at least one filter for preventing false positives.

10. The device of claim 9, wherein the at least one filter comprises a plurality of actions to be executed by the microprocessor, the plurality of actions comprising:
monitoring the velocity of the device;
recording a plurality of velocity values in the memory;
monitoring the acceleration of the device via the accelerometer;
determining when the velocity falls within a predetermined range;
determining when the acceleration exceeds a predetermined threshold; and
actuating the transmit subsystem to notify an external source that a collision has occurred when both the velocity falls within a predetermined range and the acceleration exceeds the predetermined threshold.

11. The device of claim 10, wherein the plurality of actions further comprises determining the velocity of the device after the acceleration falls below a predetermined minimum threshold.

12. The device of claim 10, wherein the actuating the transmit subsystem occurs only when:

the velocity is within the predetermined range;
the acceleration exceeds the predetermined threshold; and
the velocity of the device, after the acceleration falls below the predetermined minimum threshold, falls below a second predetermined minimum threshold.

13. The device of claim 12, wherein the actuating the transmit subsystem occurs only when the acceleration exceeds the predetermined threshold for at least a predetermined minimum time.

14. The device of claim 10, wherein the plurality of actions further comprises:
determining the operability of the keypad;
notifying a user that a collision has been detected; and
notifying the user that the transmit subsystem will be actuated if a key is not pressed.

15. The device of claim 14, wherein the plurality of actions further comprises actuating the transmit subsystem when the keypad is inoperable.

16. The device of claim 2 or 10, wherein the memory comprises at least one message, wherein when the microprocessor actuates the transmit subsystem, the at least one message is transmitted.

17. The device of claim 1, wherein the device is selected from one of the following: a cellular telephone, a pager, a two-way radio, or a personal digital assistant.

18. A portable, electronic device capable of detecting a collision, the device comprising:
a controller subsystem comprising a microprocessor and a memory, the memory having firmware stored therein, and the firmware comprises at least one filter for preventing false positives;
a radio-frequency transmit and receive subsystems;
a global positioning system subsystem;
an accelerometer; and
a means for detecting a vehicular cradle,
wherein the at least one filter comprises a plurality of actions to be executed by the microprocessor, the plurality of actions comprising:
monitoring the velocity of the device;
recording a plurality of velocity values in the memory;
monitoring the acceleration of the device via the accelerometer;
determining when the velocity falls within a predetermined range;
determining when the acceleration exceeds a predetermined threshold; and
actuating the transmit subsystem to notify an external source that a collision has occurred when both the velocity falls within a predetermined range and the acceleration exceeds the predetermined threshold.

* * * * *